Feb. 16, 1960 R. L. FRENCH ET AL 2,925,494

NOISE REJECTION CIRCUIT

Filed April 17, 1957

INVENTORS
ROBERT FRENCH
ROBERT F. CASEY

BY Alfred B. Freeman
AGENT

United States Patent Office 2,925,494

Patented Feb. 16, 1960

2,925,494

NOISE REJECTION CIRCUIT

Robert L. French, Boonton, and Robert F. Casey, Pompton Plains, N.J., assignors to Monroe Calculating Machine Company, Orange, N.J., a corporation of Delaware Application April 17, 1957, Serial No. 653,326

4 Claims. (Cl. 250—27)

This invention relates to a noise rejection circuit which is amplitude discriminative and which shifts the levels of discrimination with changes in the characteristics of the signal being handled.

In some types of magnetic recording systems for digital information, the noise and desired signal levels in the playback change with the nature of the preceding recorded information. The magnitude of these changes increases as the digits of the recorded information are more closely spaced to obtain a larger storage capacity for a given recording area. Greater reliability or closer spacing of digits is possible if the level of discrimination between noise and signal is always at the optimum point.

The circuit of the instant invention changes the levels at which it discriminates between noise and desired signal in accordance with the nature of the preceding information handled. The relation between the change and the nature of the preceding information handled is made such that the level of discrimination is always that which will best distinguish between the noise and signal being received.

An object of the invention is a noise rejection circuit which will adapt automatically to changes in the signal and noise being handled.

A further object of the invention is an improved noise rejection circuit for digital magnetic recording playback systems in which the noise and signal vary in amplitude with the nature of the preceding information.

Other objects and advantages together with a fuller understanding of the invention may be had by referring to the following description and claims taken in conjunction with the accompanying drawings in which:

Figure 1:
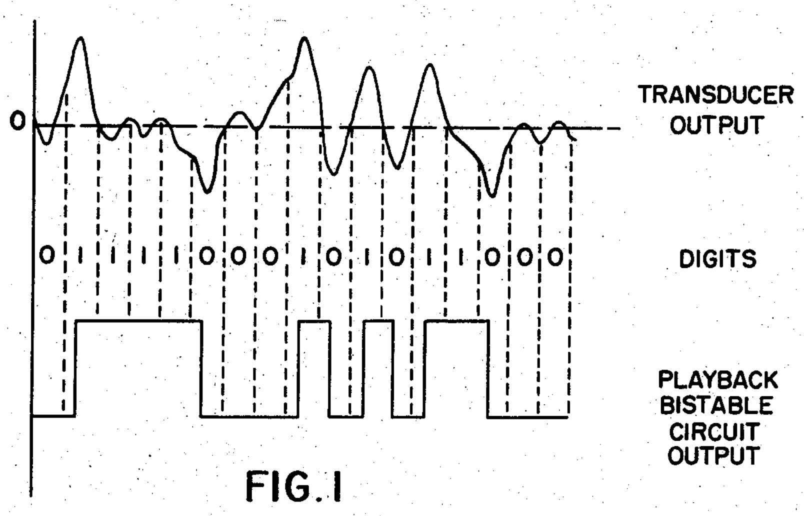
Fig. 1 shows a representative output waveform from a magnetic transducer playing back one type of magnetically recorded digital information and the corresponding output waveform desired from the playback circuit.

The binary information, whose playback is shown in Fig. 1, was recorded by applying pulses of one polarity for "1" digits and pulses of the opposite polarity for "0" digits. As will be seen from Fig. 1, a high amplitude pulse of one polarity is obtained in the playback each time the recorded information changes from a "1" to a "0" digit and of the opposite polarity each time it changes from a "0" to a "1" digit. Each successive digit in a series of like digits produces pulses of lower amplitude.

The desired playback bistable circuit output waveform, shown in Fig. 1, is positive during each "1" digit interval and negative during each "0" digit interval. It is representative of the information being played back when coordinated with a series of clock pulses marking each digit interval and systems for coordinating and using information in this form are well known in the digital computer field. The waveform can be produced by a bistable circuit triggered to one condition by the high amplitude positive playback pulses and to the other condition by the high amplitude negative playback pulses.

Where such an output system is used, the desired playback signal to trigger the bistable circuit consists solely of the high amplitude pulses marking each change of information from a "1" to a "0" digit and vice versa. It will be noted that the amplitude of these pulses, as shown in Fig. 1, increases as the number of successive opposite value digits immediately preceding the change increases. A "hip" on the leading edge of the high amplitude pulse also increases in amplitude in the same proportion as the pulse.

These "hips" on the leading edge of the high amplitude pulses can cause premature triggering of the bistable circuit and so produce an erroneous indication of the value of the preceding digit. The "hips" increase in amplitude as the recorded information is more closely spaced on the magnetic medium. The storage capacity of a given magnetic recording unit can thus be increased if the ability of the playback circuit to distinguish the "hips" from the desired signal is increased.

In computers and other digital data processing equipment, a number of magnetic transducers sensing different recording channels are selectively switched to a given playback circuit as information at different locations in storage is required. Differences in losses in the selection paths or in the magnetic transducers and their physical spacing from the recording medium result in different output signal levels. The different signal levels which must be handled make it more difficult to discriminate between signal and noise in all cases.

Figure 2:
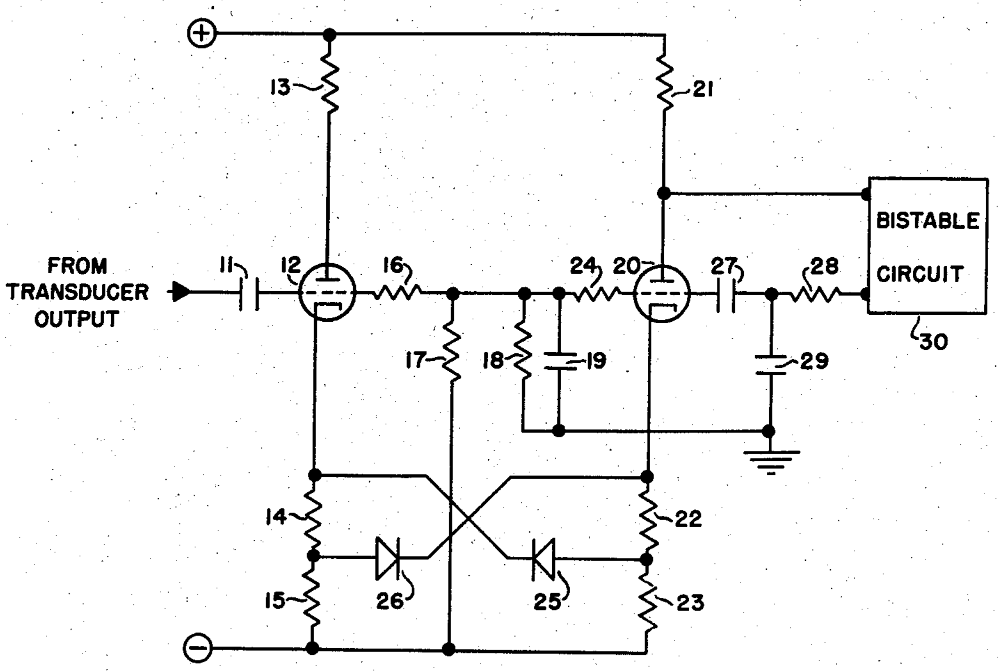
Fig. 2 is a schematic diagram of an embodiment of the invention.

Referring now to Fig. 2, a magnetic transducer output, such as that shown in Fig. 1, is applied to the grid of tube 12 through condenser 11. Tube 12 has its plate connected to a source of positive potential through resistor 13 and its cathode to a source of negative potential through the series combination of resistors 14 and 15. The grid of tube 12 is also connected through resistor 16 to the junction of resistors 17 and 18. The other terminal of resistor 17 is connected to the source of negative potential, while the other terminal of resistor 18 is connected to ground. Condenser 19 is connected in parallel with resistor 18.

Tube 20 has its plate connected to the positive voltage source through resistor 21 and its cathode to the negative voltage source through the series combination of resistors 22 and 23. Resistor 24 is connected between the grid of tube 20 and the common terminal of resistors 16, 17 and 18. Rectifier 25 is connected between the cathode of tube 12 and the junction of resistors 22 and 23. Rectifier 26 is connected between the cathode of tube 20 and the junction of resistors 14 and 15.

The grid of tube 20 is coupled through condenser 27 to the junuction of resistor 28 and condenser 29. The other end of resistor 28 is connected to an output of bistable circuit 30 and the other side of condenser 29 is connected to ground. The plate of tube 20 is connected to the trigger input to bistable circuit 30. Bistable circuit 30 may be of any suitable type which is set to one condition by a positive going voltage and to the other condition by a negative going voltage.

The transducer output signal applied to the grid of tube 12 through condenser 11 appears across resistors 14 and 15 due to the cathode follower action. When the junction of resistors 14 and 15 goes more positive than the cathode of tube 20, rectifier 26 conducts and the more positive going part of the signal is applied across resistors 22 and 23. When the cathode of tube 12 goes more negative than the junction of resistors 22 and 23, rectifier 25 conducts and the more negative going part of the signal is applied across resistor 23.

With no signal applied, the cathode of tube 12 and the junction of resistors 14 and 15 may be at substantially the same potentials as the cathode of tube 20 and the junction of resistors 22 and 23 respectively. Only signal components greater in amplitude than half the voltage across resistor 22 will then cause rectifiers 25 or 26 to conduct and affect the potential on the cathode of tube 20. With its grid held at a fixed potential, tube 20 functions as a cathode driven amplifier and these signal components also appear across plate load resistor 21.

The functioning of the circuit thus far described is substantially the same as that of the amplitude discriminative circuit disclosed in U.S. patent application Serial Number 539,717 filed October 11, 1955 by Robert F. Casey. Signal and noise components below the amplitude necessary to affect the cathode of tube 20 are rejected and only those signal components greater than this amplitude appear across resistor 21 and are applied to the trigger input of bistable circuit 30.

In the instant circuit, the grid of tube 20 is coupled to an output of bistable circuit 30 through condenser 27 and the integrating network formed by resistor 28 and condenser 29. Condenser 29 charges through resistor 28 to alternately different voltages each time bistable circuit 30 changes coindition. The values of condenser 27 and resistor 24 are such that their time constant is relatively long and the potential on the grid of tube 20 changes by substantially the same amount as the voltage across condenser 29.

An increase in potential on the grid of tube 20 will increase the average potential on its cathode and on the junction of resistors 22 and 23. A smaller negative signal amplitude will then be required to cause rectifier 25 to conduct than before the increase. A larger positive signal amplitude will be required to cause rectifier 26 to conduct and the levels of amplitude discrimination will have been shifted in one direction by the increase of potential on the grid of tube 20. A decrease in potential on the grid of tube 20 will shift the level of amplitude discrimination in the opposite direction.

The charge on condenser 29 will vary between the two values of potential provided by the output from bistable circuit 30 in its two different conditions. The change from one value to the other across condenser 29 will be delayed due to the time required for charging condenser 29 through resistor 28. This time constant is chosen so that the change of voltage after bistable circuit 30 changes condition substantially follows the same pattern as the increase of amplitude of the leading "hips" on the high amplitude pulses from the transducer.

The change in voltage on condenser 29 after each change of condition of bistable circuit shifts the levels of positive and negative amplitude discrimination through its action on the grid of tube 20. The direction of the shift is such that the amplitude of a signal pulse of the polarity required to trigger bistable circuit 30 must be increased to produce an output across resistor 21. Low amplitude pulses and noise of the opposite polarity are passed at lesser amplitudes but are ineffective to trigger bistable circuit 30 because of their polarity.

Immediately following a change of condition of bistable circuit 30, a minimum amplitude of signal pulse of the proper polarity will trigger bistable circuit 30 in the opposite direction. The required amplitude increases with time as condenser 29 charges through resistor 28. The noise and "hips" can thus increase in amplitude after each change of state without producing a premature triggering and yet the circuit is set to operate on the lower amplitude pulse produced if the recorded information includes two successive changes of the type of digit.

It will be recognized that rectifiers 25 and 26 could be replaced by a varistor as disclosed in U.S. patent application Serial Number 539,717 filed October 11, 1955 by Robert F. Casey and similar results would still be obtained. It will be recognized further that various other changes and modifications can be made without departing from the spirit and scope of the invention as defined in the following claims.

What is claimed is:

1. The combination of an amplifier circuit having input, output and control terminals and being of a type which discriminates against signal components below amplitude levels dependent on the potential applied to its control terminal, means for applying signals to the input terminal of said amplifier circuit, a bistable circuit having its trigger input connected to the output terminal of said amplifier circuit and an output, and means connected to thes output of said bistable circuit and to the control terminal of said amplifier circuit for integrating the potential appearing on the output of said bistable circuit and for impressing said integrated potential on the control terminal of said amplifier circuit.

2. The combination according to claim 1 wherein said amplifier circuit comprises a normally conducting cathode follower having a control element connected to said input terminal, a normally conducting amplifier having an anode connected to said output terminal, a control element connected to said control terminal, and a cathode, and means for coupling the output of said cathode follower to the cathode of said amplifier, said coupling means being of a type offering a higher impedance to potential differences below a given magnitude than to those above the given magnitude.

3. The combination according to claim 2 wherein said coupling means comprises first and second rectifiers having their cathodes connected respectively to the cathodes of said cathode follower and said amplifier and a pair of resistors connecting the anodes of said second and first rectifiers respectively with the cathodes of said cathode follower and said amplifier.

4. The combination according to claim 2 wherein said coupling means comprises a varistor.

References Cited in the file of this patent

UNITED STATES PATENTS

| | | |
|---|---|---|
| 2,636,985 | Weissman | Apr. 28, 1953 |
| 2,661,421 | Talamini Jr. et al. | Dec. 1, 1953 |
| 2,769,905 | Ropiequet | Nov. 6, 1956 |